United States Patent
Sengupta et al.

(10) Patent No.: US 12,552,943 B2
(45) Date of Patent: Feb. 17, 2026

(54) PYROCHLORE/DEFECT FLUORITE ZIRCONATES

(71) Applicant: General Electric Company, Schenectady, NY (US)

(72) Inventors: Arundhati Sengupta, Bangalore (IN); Mohandas Nayak, Bangalore (IN); Sundeep Kumar, Bangalore (IN); Vipin Raju S, Bangalore (IN)

(73) Assignee: General Electric Company, Evendale, OH (US)

( * ) Notice: Subject to any disclaimer, the term of this patent is extended or adjusted under 35 U.S.C. 154(b) by 749 days.

(21) Appl. No.: 17/838,567

(22) Filed: Jun. 13, 2022

(65) Prior Publication Data

US 2023/0257595 A1    Aug. 17, 2023

(30) Foreign Application Priority Data

Feb. 16, 2022 (IN) .............................. 202211008138

(51) Int. Cl.
*C09D 5/00* (2006.01)
*C09D 5/18* (2006.01)
(Continued)

(52) U.S. Cl.
CPC ................ *C09D 5/18* (2013.01); *C22C 16/00* (2013.01); *C22C 29/12* (2013.01)

(58) Field of Classification Search
None
See application file for complete search history.

(56) References Cited

U.S. PATENT DOCUMENTS

| 6,231,991 B1 | 5/2001 | Maloney |
| 6,284,323 B1 | 9/2001 | Maloney |

(Continued)

FOREIGN PATENT DOCUMENTS

| CN | 102127738 B | 1/2013 |
| CN | 102070335 B | 9/2013 |

(Continued)

OTHER PUBLICATIONS

CN-111978761-A, English translation (Year: 2020).*

(Continued)

*Primary Examiner* — Stefanie J Cohen
(74) *Attorney, Agent, or Firm* — Dority & Manning, P.A.

(57) ABSTRACT

A composition comprising a rare earth-doped zirconium/hafnium oxide is provided that has a defect-fluorite structure or a pyrochlore structure. The rare earth-doped zirconium/hafnium oxide has a formula: $(Ln^1_a Ln^2_a Ln^3_a Ln^4_a Ln^5_b)_2 M_2 O_7$ where each of $Ln^1$, $Ln^2$, $Ln^3$, $Ln^4$, and $Ln^5$ is a different rare earth element such that $Ln^1$ and M have a first atomic radius ratio that is 1.35 to 1.45, $Ln^2$ and M have a second atomic radius ratio that is 1.35 to 1.45, $Ln^3$ and M have a third atomic radius ratio that is 1.46 to 1.78, and $Ln^4$ and M have a fourth radius ratio that is 1.46 to 1.78; a is 0.2 or 0.25; b is 0.2 when a is 0.2, and b is 0 when a is 0.25; and M is Zr, Hf, or a mixture thereof. Methods of forming a coating that includes this composition, along with the resulting coated components, are also provided.

7 Claims, 2 Drawing Sheets

(51) Int. Cl.
  *C22C 16/00* (2006.01)
  *C22C 29/12* (2006.01)

(56) References Cited

U.S. PATENT DOCUMENTS

| | | |
|---|---|---|
| 9,611,551 B2 | 4/2017 | Kaiser et al. |
| 9,677,167 B2 | 6/2017 | Bochiechio |
| 2002/0172799 A1* | 11/2002 | Subramanian ............ C23C 4/01 428/116 |
| 2007/0160859 A1 | 7/2007 | Darolia et al. |
| 2021/0347699 A1 | 11/2021 | He et al. |

FOREIGN PATENT DOCUMENTS

| | | | | |
|---|---|---|---|---|
| CN | 108675824 A | | 10/2018 | |
| CN | 111978761 A | * | 11/2020 | ............... C09D 5/18 |
| KR | 20170032836 A | | 3/2017 | |

OTHER PUBLICATIONS

Zhou et al: "High-entropy thermal barrier coating of rare-earth zirconate: A case study on (La0.2Nd0.2Sm0.2Eu0.2Gd0.2)2Zr2O7 prepared by atmospheric plasma spraying", Journal of the European Ceramic Society, Amsterdam, vol. 40, No. 15, Jul. 25, 2020, pp. 5731-5739.

Zhu et al: "Dual-phase rare-earth-zirconate high-entropy ceramics with glass-like thermal conductivity", Journal of the European Ceramic Society, Amsterdam, vol. 41, No. 4, Nov. 24, 2020, pp. 2861-2869.

* cited by examiner

PYROCHLORE/DEFECT FLUORITE ZIRCONATES

PRIORITY INFORMATION

The present application claims priority to Indian Provisional Patent Application No. 202211008138 filed on Feb. 16, 2022.

FIELD OF TECHNOLOGY

This disclosure broadly relates to ultra-low thermal conductivity pyrochlore/defect fluorite zirconates. More particularly, this disclosure generally relates to compositions suitable for use in coating systems on components exposed to high-temperature environments, such as the hot gas flow path through a gas turbine engine.

BACKGROUND

The use of thermal barrier coatings on components such as combustors, high pressure turbine (HPT) blades and vanes of gas turbine engines is increasing. Generally, the thermal insulation of a TBC enables such components to survive higher operating temperatures, increases component durability, and improves engine reliability. In order for a TBC to remain effective throughout the planned life cycle of the component it protects, it is desired that the TBC has a low thermal conductivity throughout the life of the component, including high temperature excursions. Additionally, it is desired that the TBC has a high toughness which reduces the damage due to erosion and impact on rotating components of HPTs, combustor components, and static turbine components (e.g., turbine nozzles). Low thermal conductivity TBCs can increase efficiency by reducing heat loss and potentially allowing higher temperature operation.

Current TBC material 8YSZ is known for its high toughness, but also high thermal conductivity. Low thermal conductivity compositions such as 55YSZ lacks high toughness. Thus, further improvements in TBC technology are desirable, particularly as TBCs are employed to thermally insulate components intended for more demanding engine designs.

BRIEF DESCRIPTION OF THE DRAWINGS

A full and enabling disclosure of the present disclosure, including the best mode thereof, directed to one of ordinary skill in the art, is set forth in the specification, which makes reference to the appended Figs., in which.

Figure 1:
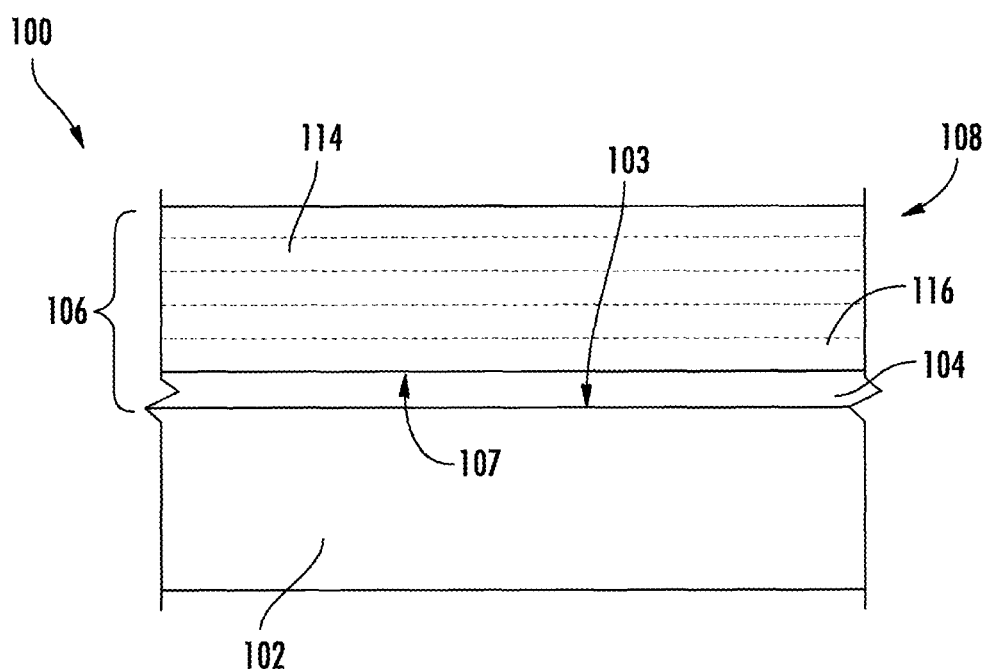
FIG. 1 is a cross-sectional side view of an exemplary coated component.

Repeat use of reference characters in the present specification and drawings is intended to represent the same or analogous features or elements of the present disclosure.

Definitions

As used herein, the word "exemplary" means "serving as an example, instance, or illustration." Any implementation described herein as "exemplary" is not necessarily to be construed as preferred or advantageous over other implementations. Additionally, unless specifically identified otherwise, all embodiments described herein should be considered exemplary.

The term "gas turbine engine" refers to an engine having a turbomachine as all or a portion of its power source. Example gas turbine engines include turbofan engines, turboprop engines, turbojet engines, turboshaft engines, etc., as well as hybrid-electric versions of one or more of these engines. The term "turbomachine" or "turbomachinery" refers to a machine including one or more compressors, a heat generating section (e.g., a combustion section), and one or more turbines that together generate a torque output.

In the present disclosure, when a layer is being described as "on" or "over" another layer or substrate, it is to be understood that the layers can either be directly contacting each other or have another layer or feature between the layers, unless expressly stated to the contrary. Thus, these terms are simply describing the relative position of the layers to each other and do not necessarily mean "on top of" since the relative position above or below depends upon the orientation of the device to the viewer.

Chemical elements are discussed in the present disclosure using their common chemical abbreviation, such as commonly found on a periodic table of elements. For example, hydrogen is represented by its common chemical abbreviation H; helium is represented by its common chemical abbreviation He; and so forth.

As used herein, "Ln" refers to a rare earth element or a mixture of rare earth elements. More specifically, the "Ln" refers to the rare earth elements of scandium (Sc), yttrium (Y), lanthanum (La), cerium (Ce), praseodymium (Pr), neodymium (Nd), promethium (Pm), samarium (Sm), europium (Eu), gadolinium (Gd), terbium (Tb), dysprosium (Dy), holmium (Ho), erbium (Er), thulium (Tm), ytterbium (Yb), lutetium (Lu), or mixtures thereof.

As used herein, the term "substantially free" is understood to mean completely free of said constituent, or inclusive of trace amounts of same. "Trace amounts" are those quantitative levels of chemical constituent that are barely detectable and provide no benefit to the functional or aesthetic properties of the subject composition. The term "substantially free" also encompasses completely free.

As used herein, the term "substantially equal" is understood to be inclusive of a minor trace variation of a quantitative level that is barely detectable and provides no benefit to the functional or aesthetic properties of the subject composition. The term "substantially equal" also encompasses completely equal.

DETAILED DESCRIPTION OF PARTICULAR EMBODIMENTS

Reference now will be made in detail to embodiments of the disclosure, one or more examples of which are illustrated in the drawings. Each example is provided by way of explanation of the disclosure, not limitation of the disclosure. In fact, it will be apparent to those skilled in the art that various modifications and variations can be made in the present disclosure without departing from the scope of the disclosure. For instance, features illustrated or described as part of one embodiment can be used with another embodiment to yield a still further embodiment. Thus, it is intended that the present disclosure covers such modifications and variations as come within the scope of the appended claims and their equivalents.

Compositions are generally disclosed that are based on a rare earth-zirconium/hafnium oxides having a pyrochlore or defect-fluorite structure, along with coatings formed with such compositions. These compositions and coating may have a relatively low thermal conductivity (e.g., 0.5 W/m-K to 1.5 W/m-K at 1000° C., such as 0.5 W/m-K to 1.4 W/m-K at 1000° C., in a 95-100% dense puck as measured via a laser flash method according to ASTM E1461-13). Generally, these compositions may be used to form a layer of a TBC that has an ultra-low thermal conductivity, along with suitable toughness (e.g., an indentation fracture toughness of 2 MPa-m$^{0.5}$ to 3 MPa-m$^{0.5}$ in a 95-100% dense puck).

In one particular embodiment, the layer of the TBC may have a single phase (i.e., either a pyrochlore structure or defect-fluorite structure). Thus, the resulting TBC would allow for higher component surface temperatures and/or reduced coating thickness for the same surface temperature. Reduced TBC thickness, especially in applications like combustors which require relatively thick TBCs, would result in a significant cost reduction as well as weight benefit.

The composition generally includes a rare earth-doped zirconium/hafnium oxide having a defect-fluorite structure or a pyrochlore structure. In one embodiment, the rare earth-doped zirconium/hafnium oxide has a formula as shown in Formula 1:

$$(Ln^1{}_a Ln^2{}_a Ln^3{}_a Ln^4{}_a Ln^5{}_b)_2 M_2 O_7 \qquad \text{Formula 1:}$$

where each of $Ln^1$, $Ln^2$, $Ln^3$, $Ln^4$, and $Ln^5$ is a different rare earth element such that $Ln^1$ and M have a first atomic radius ratio that is 1.35 to 1.45, $Ln^2$ and M have a second atomic radius ratio that is 1.35 to 1.45, $Ln^3$ and M have a third atomic radius ratio that is 1.46 to 1.78, and $Ln^4$ and M have a fourth radius ratio that is 1.46 to 1.78; a is 0.2 or 0.25; b is 0.2 when a is 0.2, and b is 0 when a is 0.25; and M is Zr, Hf, or a mixture thereof.

Generally, each of $Ln^1$ and $Ln^2$ is a different rare earth element that forms a defect fluorite as $Ln_2Zr_2O_7$ (e.g., Tb, Dy, Y, Ho, Er, Tm, Yb, and Lu) and/or forms a defect fluorite as $Ln_2Hf_2O_7$ (e.g., Dy, Y, Ho, Er, Tm, Yb, and Lu). In particular embodiments, each of $Ln^1$ and $Ln^2$ is a different rare earth element selected from the group consisting of Tb, Dy, Y, Ho, Er, Tm, Yb, and Lu.

Alternatively, each of $Ln^3$ and $Ln^4$ is a different rare earth element that forms a pyrochlore as $Ln_2Zr_2O_7$ (e.g., La, Ce, Pr, Nd, Pm, Sm, Eu, and Gd) and/or forms a pyrochlore as $Ln_2Hf_2O_7$ (e.g., La, Ce, Pr, Nd, Pm, Sm, Eu, Gd, and Tb). In particular embodiments, each of $Ln^1$ and $Ln^2$ is a different rare earth element selected from the group consisting of La, Ce, Pr, Nd, Pm, Sm, Eu, Gd, and Tb.

In one particular embodiment, a is 0.2 such that the rare earth-doped zirconium/hafnium oxide has a formula as shown in Formula 2:

$$(Ln^1{}_{0.2} Ln^2{}_{0.2} Ln^3{}_{0.2} Ln^4{}_{0.2} Ln^5{}_{0.2})_2 M_2 O_7 \qquad \text{Formula 2:}$$

where each of $Ln^1$, $Ln^2$, $Ln^3$, $Ln^4$, and $Ln^5$ is a different rare earth element such that $Ln^1$ and M have a first atomic radius ratio that is 1.35 to 1.45, $Ln^2$ and M have a second atomic radius ratio that is 1.35 to 1.45, $Ln^3$ and M have a third atomic radius ratio that is 1.46 to 1.78, and $Ln^4$ and M have a fourth radius ratio that is 1.46 to 1.78; and M is Zr, Hf, or a mixture thereof. In such an embodiment, $Ln^5$ and M may have a second atomic radius ratio that is either 1.35 to 1.45 or 1.46 to 1.78.

In another particular embodiment, a is 0.25 and b is 0 such that the rare earth-doped zirconium/hafnium oxide has a formula as shown in Formula 3:

$$(Ln^1{}_{0.25} Ln^2{}_{0.25} Ln^3{}_{0.25} Ln^4{}_{0.25})_2 M_2 O_7 \qquad \text{Formula 3:}$$

where each of $Ln^1$, $Ln^2$, $Ln^3$, and $Ln^4$ is a different rare earth element such that $Ln^1$ and M have a first atomic radius ratio that is 1.35 to 1.45, $Ln^2$ and M have a second atomic radius ratio that is 1.35 to 1.45, $Ln^3$ and M have a third atomic radius ratio that is 1.46 to 1.78, and $Ln^4$ and M have a fourth radius ratio that is 1.46 to 1.78; and M is Zr, Hf, or a mixture thereof.

As stated, M in any of Formulas 1, 2, or 3 may be Zr, Hf, or a mixture thereof due to the similarity of $ZrO_2$ and $HfO_2$ chemistries and the ionic radii of $Zr^{4+}$ (0.72 Å) and $Hf^{4+}$ (0.71 Å). Thus, M may be 0 atomic % to 100 atomic % of Zr. Conversely, M may be 0 at. % to 100 at. % of Hf. However, in particular embodiments, Zr may form half or more of the atomic percentage of M, such that M is 50 atomic % to 100 atomic % of Zr. In one particular embodiment, Zr is the predominate constituent of M (e.g., M is 95 atomic % to 100 atomic % of Zr). For instance, in certain embodiments, M may consist of Zr (i.e., M is 100 atomic % of Zr).

Particularly suitable compositions of rare earth-doped zirconium/hafnium oxide having a defect-fluorite structure or a pyrochlore structure may include, but are not limited to:
$(Nd_{0.2}Eu_{0.2}Y_{0.2}Dy_{0.2}Lu_{0.2})_2Zr_2O_7$;
$(Nd_{0.2}Eu_{0.2}Tb_{0.2}Dy_{0.2}Lu_{0.2})_2Zr_2O_7$;
$(Sm_{0.2}Eu_{0.2}Gd_{0.2}Dy_{0.2}Lu_{0.2})_2Zr_2O_7$;
$(Sm_{0.2}Eu_{0.2}Y_{0.2}Dy_{0.2}Lu_{0.2})_2Zr_2O_7$;
$(Nd_{0.2}Eu_{0.2}La_{0.2}Dy_{0.2}Lu_{0.2})_2Zr_2O_7$;
$(Nd_{0.2}Eu_{0.2}Ho_{0.2}Dy_{0.2}Lu_{0.2})_2Zr_2O_7$;
$(Nd_{0.2}Eu_{0.2}Y_{0.2}Dy_{0.2}Er_{0.2})_2Zr_2O_7$;
$(Nd_{0.2}Eu_{0.2}Ho_{0.2}Dy_{0.2}Er_{0.2})_2Zr_2O_7$;
$(Sm_{0.2}Eu_{0.2}Ho_{0.2}Dy_{0.2}Lu_{0.2})_2Zr_2O_7$;
$(Nd_{0.25}Eu_{0.25}Ho_{0.25}Dy_{0.25})_2Zr_2O_7$;
$(Nd_{0.25}Eu_{0.25}Y_{0.25}Dy_{0.25})_2Zr_2O_7$;
$(Sm_{0.25}Eu_{0.25}Ho_{0.25}Dy_{0.25})_2Zr_2O_7$; or mixtures thereof.

As stated above, the compositions of rare earth-doped zirconium/hafnium oxide having a defect-fluorite structure or a pyrochlore structure are particularly suitable for use in a layer of a thermal barrier coating on a component.

Referring to FIG. 1, for example, an exemplary coated component 100 is shown formed from a substrate 102 having a surface 103 with a coating system 106 thereon. Generally, the coating system 106 includes a bond coat 104 on the surface 103 of the substrate 102, and a TBC 108 on the bond coat 104. In the embodiment shown, the bond coat 104 is directly on the surface 103 without any layer in between. Bond coat materials widely used in TBC systems may include, but are not limited to, oxidation-resistant overlay coatings such as MCrAlX (where M is iron, cobalt and/or nickel, and X is yttrium or another rare earth element), and oxidation-resistant diffusion coatings such as diffusion aluminides that contain aluminum intermetallics.

The substrate 102 may be any suitable material, for example a metal such as steel or superalloys (e.g., nickel-based superalloys, cobalt-based superalloys, or iron-based superalloys, such as Rene N5, N500, N4, N2, IN718, Hastelloy X, or Haynes 188) or other suitable materials for withstanding high temperatures. The coating system 106 may be disposed along one or more portions of the substrate 102 or disposed substantially over the whole exterior of the substrate 102. In particular embodiments, the coating system 106 may have a total thickness of 50 micrometer (e.g., micron or μm) to 2500 μm, such as 100 μm to 700 μm.

The TBC 108 may be formed from a plurality of individual layers 114. In one embodiment, at least one of the layers 114 of the TBC 108 includes a layer comprising the composition of rare earth-doped zirconium/hafnium oxide having a defect-fluorite structure or a pyrochlore structure (such as having the formula of Formula 1). For example, at least one of the layers 114 of the TBC 108 may include at least 80% by weight of the composition of rare earth-doped zirconium/hafnium oxide having a defect-fluorite structure or a pyrochlore structure (such as having the formula of Formula 1). In one embodiment, at least one of the layers 114 of the TBC 108 may include 90% by weight to 100% by weight of the composition of rare earth-doped zirconium/hafnium oxide having a defect-fluorite structure or a pyrochlore structure (such as having the formula of Formula 1).

In particular embodiments, each of the layers 114 of the TBC 108 may have a layer thickness of 25 μm to 100 μm (e.g., 25 μm to 50 μm).

One or more of the individual layers 114 may be formed from a stabilized ceramic that can sustain a fairly high temperature gradient such that the coated metallic components can be operated at gas temperatures higher than the metal's melting point. For instance, the stabilized ceramic material may be one or more of yttria stabilized zirconia (YSZ) and other rare-earth-stabilized zirconia compositions, mullite ($3Al_2O_3$-$2SiO_2$), alumina, ceria ($CeO_2$), lanthanum rare-earth zirconates, rare-earth oxides (e.g., $La_2O_3$, $Nb_2O_5$, $Pr_2O_3$, $CeO_2$), and metal-glass composites, and combinations thereof (e.g., alumina and YSZ or ceria and YSZ). Besides its high temperature stability, YSZ also has a good combination of high toughness and chemical inertness, and the thermal expansion coefficient of YSZ is a comparatively suitable match to that of the metallic components being coated.

The individual layers 114 may be formed by any suitable process. For instance, one or more individual layer 114 may be formed by air-plasma spray (APS), suspension plasma spray (SPS), solution precursor plasma spray (SPPS), electron beam physical vapor deposition (EBPVD), high velocity oxygen fuel (HVOF), electrostatic spray assisted vapor deposition (ESAVD), and direct vapor deposition.

In one embodiment, the TBC 108 may include a layer based on an YSZ (e.g., 8YSZ) closest to the substrate 102, such as directly on the bond coat 104 (if present). As such, the yttria-stabilized zirconia may form a barrier coating positioned between the substrate and the layer comprising the composition of rare earth-doped zirconium/hafnium oxide having a defect-fluorite structure or a pyrochlore structure (such as having the formula of Formula 1).

The coated component 100 is particularly suitable for use as a component found in high temperature environments, such as those present in gas turbine engines, for example, combustor components, turbine blades, shrouds, nozzles, heat shields, and vanes. In particular, the coated component 100 may be a component positioned within a hot gas flow path of the gas turbine such that the coating system 106 forms a thermal barrier for the underlying substrate 102 to protect the component 100 within the gas turbine when exposed to the hot gas flow path.

The coating including the rare earth-doped zirconium/hafnium oxide may be achieved by making use of powder feedstock synthesized from wet-chemical synthesis routes using suitable metal (Ln, Hf, Zr) precursors, either organic (e.g., alkoxides such propoxide, butoxide, isopropoxide, ethoxide, tetraethoxide, or triethoxide of metal) or inorganic (e.g., chlorides, oxychlorides, nitrates, oxynitrates, carbonates of metal), in a suitable solvent (e.g., aqueous or organic or combination). Suitable organic solvents may include, but are not limited to, isopropanol, ethanol, butanol, or ethylene glycol monobutyl ether. Additional components in the wet chemical route may include an organic acid (e.g., citric acid or acetic acid), an inorganic acid (e.g., HCl or $HNO_3$), an organic base (e.g., diethylamine, triethylamine, or diethylenetriamine), or an inorganic base (e.g., NaOH or $NH_4OH$). Viscosity modifiers (e.g., glycerol, ethylene glycol, ethylacetate, or polyethylene glycol) may also be present. Non-limiting examples of wet-chemical routes include sol-gel, polymer precursor or gel-combustion, hydrothermal or solvothermal, co-precipitation, co-precipitation hydrothermal combination, and co-precipitation molten salt method combination. In these methods, the initial processing may be carried out at room-temperature to about 200° C., after which a heat-treatment at low temperatures of 500° C. to 1000° C. (which is relatively low in comparison to solid-state synthesis routes) can lead to formation of the final composition with low grain-sizes (e.g., within the nano dimension, such as 10 nm to 100 nm). Powder particles of the composition achieved in this way can be spray-coated by methods referred to above to achieve the final coating with fine-grained microstructure (e.g., 2 to 10 m) which can be retained during heating cycles owing to the inherent sinter resistance of these compositions.

Figure 2:
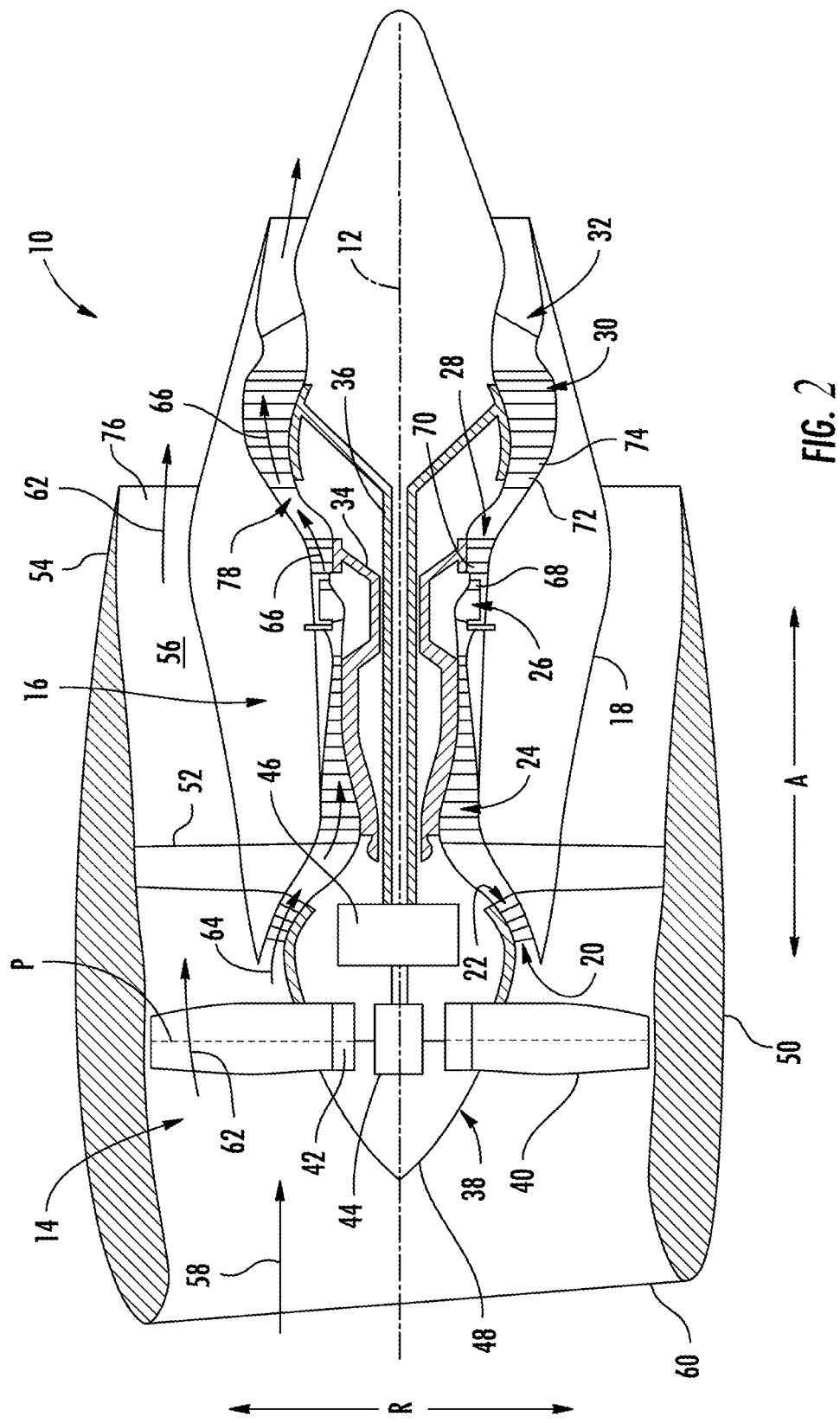
FIG. 2 is a schematic cross-sectional view of an exemplary gas turbine engine according to various embodiments of the present subject matter.

FIG. 2 is a schematic cross-sectional view of a gas turbine engine in accordance with an exemplary embodiment of the present disclosure. More particularly, for the embodiment of FIG. 2, the gas turbine engine is a high-bypass turbofan engine 10, referred to herein as "turbofan engine 10." As shown in FIG. 2, the turbofan engine 10 defines an axial direction A (extending parallel to a longitudinal axis 12 provided for reference) and a radial direction R. In general, the turbofan engine 10 includes a fan section 14 and a core turbine engine 16 disposed downstream from the fan section 14. Although described below with reference to a turbofan engine 10, the present disclosure is applicable to turbomachinery in general, including turbojet, turboprop and turboshaft gas turbine engines, including industrial and marine gas turbine engines and auxiliary power units. It is also applicable to other high temperature applications that contain water vapor in the gas phase, such as those arising from combustion of hydrocarbon fuels.

The exemplary core turbine engine 16 depicted generally includes a substantially tubular outer casing 18 that defines an annular inlet 20. The outer casing 18 encases, in serial flow relationship, a compressor section including a booster or low pressure (LP) compressor 22 and a high pressure (HP) compressor 24; a combustion section 26; a turbine section including a high pressure (HP) turbine 28 and a low pressure (LP) turbine 30; and a jet exhaust nozzle section 32. A high pressure (HP) shaft or spool 34 drivingly connects the HP turbine 28 to the HP compressor 24. A low pressure (LP) shaft or spool 36 drivingly connects the LP turbine 30 to the LP compressor 22.

For the embodiment depicted, the fan section 14 includes a variable pitch fan 38 having a plurality of fan blades 40 coupled to a disk 42 in a spaced apart manner. As depicted, the fan blades 40 extend outwardly from disk 42 generally along the radial direction R. Each fan blade 40 is rotatable relative to the disk 42 about a pitch axis P by virtue of the fan blades 40 being operatively coupled to a suitable actuation member 44 configured to collectively vary the pitch of the fan blades 40 in unison. The fan blades 40, disk 42, and actuation member 44 are together rotatable about the longitudinal axis 12 by LP spool 36 across an optional power gear box 46. The power gear box 46 includes a plurality of gears for stepping down the rotational speed of the LP spool 36 to a more efficient rotational fan speed.

Referring still to the exemplary embodiment of FIG. 2, the disk 42 is covered by rotatable front nacelle 48 aerodynamically contoured to promote an airflow through the plurality of fan blades 40. Additionally, the exemplary fan section 14 includes an annular fan casing or outer nacelle 50 that circumferentially surrounds the fan 38 and/or at least a portion of the core turbine engine 16. It should be appreciated that the nacelle 50 may be configured to be supported relative to the core turbine engine 16 by a plurality of circumferentially-spaced outlet guide vanes 52. Moreover, a downstream section 54 of the nacelle 50 may extend over an outer portion of the core turbine engine 16 so as to define a bypass airflow passage 56 therebetween.

During operation of the turbofan engine 10, a volume of air 58 enters the turbofan engine 10 through an associated inlet 60 of the nacelle 50 and/or fan section 14. As the volume of air 58 passes across the fan blades 40, a first portion of the air 58 as indicated by arrows 62 is directed or routed into the bypass airflow passage 56 and a second portion of the air 58 as indicated by arrow 64 is directed or routed into the LP compressor 22. The ratio between the first portion of air 62 and the second portion of air 64 is commonly known as a bypass ratio. The pressure of the second portion of air 64 is then increased as it is routed through the high pressure (HP) compressor 24 and into the combustion section 26, where it is mixed with fuel and burned to provide combustion gases 66.

The combustion gases 66 are routed through the HP turbine 28 where a portion of thermal and/or kinetic energy from the combustion gases 66 is extracted via sequential stages of HP turbine stator vanes 68 that are coupled to the outer casing 18 and HP turbine rotor blades 70 that are coupled to the HP shaft or spool 34, thus causing the HP shaft or spool 34 to rotate, thereby supporting operation of the HP compressor 24. The combustion gases 66 are then routed through the LP turbine 30 where a second portion of thermal and kinetic energy is extracted from the combustion gases 66 via sequential stages of LP turbine stator vanes 72 that are coupled to the outer casing 18 and LP turbine rotor blades 74 that are coupled to the LP shaft or spool 36, thus causing the LP shaft or spool 36 to rotate, thereby supporting operation of the LP compressor 22 and/or rotation of the fan 38.

The combustion gases 66 are subsequently routed through the jet exhaust nozzle section 32 of the core turbine engine 16 to provide propulsive thrust. Simultaneously, the pressure of the first portion of air 62 is substantially increased as the first portion of air 62 is routed through the bypass airflow passage 56 before it is exhausted from a fan nozzle exhaust section 76 of the turbofan engine 10, also providing propulsive thrust. The HP turbine 28, the LP turbine 30, and the jet exhaust nozzle section 32 at least partially define a hot gas path 78 for routing the combustion gases 66 through the core turbine engine 16.

Further aspects of the disclosure are provided by the subject matter of the following clauses:

1. A composition comprising: a rare earth-doped zirconium/hafnium oxide having a defect-fluorite structure or a pyrochlore structure, wherein the rare earth-doped zirconium/hafnium oxide has a formula: $(Ln^1{}_a Ln^2{}_a Ln^3{}_a Ln^4{}_a Ln^5{}_b)_2 M_2 O_7$ where each of $Ln^1$, $Ln^2$, $Ln^3$, $Ln^4$, and $Ln^5$ is a different rare earth element such that $Ln^1$ and M have a first atomic radius ratio that is 1.35 to 1.45, $Ln^2$ and M have a second atomic radius ratio that is 1.35 to 1.45, $Ln^3$ and M have a third atomic radius ratio that is 1.46 to 1.78, and $Ln^4$ and M have a fourth radius ratio that is 1.46 to 1.78; a is 0.2 or 0.25; b is 0.2 when a is 0.2, and b is 0 when a is 0.25; and M is Zr, Hf, or a mixture thereof.

2. The composition of any preceding clause, where a is 0.2 such that the rare earth-doped zirconium/hafnium oxide has a formula: $(Ln^1{}_{0.2} Ln^2{}_{0.2} Ln^3{}_{0.2} Ln^4{}_{0.2} Ln^5{}_{0.2})_2 M_2 O_7$ where each of $Ln^1$, $Ln^2$, $Ln^3$, $Ln^4$, and $Ln^5$ is a different rare earth element such that $Ln^1$ and M have a first atomic radius ratio that is 1.35 to 1.45, $Ln^2$ and M have a second atomic radius ratio that is 1.35 to 1.45, $Ln^3$ and M have a third atomic radius ratio that is 1.46 to 1.78, and $Ln^4$ and M have a fourth radius ratio that is 1.46 to 1.78; and M is Zr, Hf, or a mixture thereof.

3. The composition of any preceding clause, wherein $Ln^5$ and M have a second atomic radius ratio that is either 1.35 to 1.45 or 1.46 to 1.78.

4. The composition of any preceding clause, where a is 0.25 and b is 0 such that the rare earth-doped zirconium/hafnium oxide has a formula: $(Ln^1{}_{0.25} Ln^2{}_{0.25} Ln^3{}_{0.25} Ln^4{}_{0.25})_2 M_2 O_7$ where each of $Ln^1$, $Ln^2$, $Ln^3$, and $Ln^4$ is a different rare earth element such that $Ln^1$ and M have a first atomic radius ratio that is 1.35 to 1.45, $Ln^2$ and M have a second atomic radius ratio that is 1.35 to 1.45, $Ln^3$ and M have a third atomic radius ratio that is 1.46 to 1.78, and $Ln^4$ and M have a fourth radius ratio that is 1.46 to 1.78; and M is Zr, Hf, or a mixture thereof.

5. The composition of any preceding clause, where M is 50 atomic % to 100 atomic % of Zr.

6. The composition of any preceding clause, where M is 95 atomic % to 100 atomic % of Zr.

7. The composition of any preceding clause, where M consists of Zr.

8. The composition of any preceding clause, wherein each of $Ln^1$ and $Ln^2$ is a different rare earth element selected from the group consisting of Tb, Dy, Y, Ho, Er, Tm, Yb, and Lu.

9. The composition of any preceding clause, wherein each of $Ln^3$ and $Ln^4$ is a different rare earth element selected from the group consisting of La, Ce, Pr, Nd, Pm, Sm, Eu, and Gd.

10. The composition of any preceding clause, wherein the composition has a thermal conductivity of 0.5 W/m-K to 1.5 W/m-K at 1000° C. in a 95-100% dense puck, as measured via a laser flash method according to ASTM E1461-13.

11. The composition of any preceding clause, wherein the composition is selected from the group consisting of:
$(Nd_{0.2} Eu_{0.2} Y_{0.2} Dy_{0.2} Lu_{0.2})_2 Zr_2 O_7$;
$(Nd_{0.2} Eu_{0.2} Tb_{0.2} Dy_{0.2} Lu_{0.2})_2 Zr_2 O_7$;
$(Sm_{0.2} Eu_{0.2} Gd_{0.2} Dy_{0.2} Lu_{0.2})_2 Zr_2 O_7$;
$(Sm_{0.2} Eu_{0.2} Y_{0.2} Dy_{0.2} Lu_{0.2})_2 Zr_2 O_7$;
$(Nd_{0.2} Eu_{0.2} La_{0.2} Dy_{0.2} Lu_{0.2})_2 Zr_2 O_7$;
$(Nd_{0.2} Eu_{0.2} Ho_{0.2} Dy_{0.2} Lu_{0.2})_2 Zr_2 O_7$;
$(Nd_{0.2} Eu_{0.2} Y_{0.2} Dy_{0.2} Er_{0.2})_2 Zr_2 O_7$;
$(Nd_{0.2} Eu_{0.2} Ho_{0.2} Dy_{0.2} Er_{0.2})_2 Zr_2 O_7$;
$(Sm_{0.2} Eu_{0.2} Ho_{0.2} Dy_{0.2} Lu_{0.2})_2 Zr_2 O_7$;
$(Nd_{0.25} Eu_{0.25} Ho_{0.25} Dy_{0.25})_2 Zr_2 O_7$;
$(Nd_{0.25} Eu_{0.25} Y_{0.25} Dy_{0.25})_2 Zr_2 O_7$;
$(Sm_{0.25} Eu_{0.25} Ho_{0.25} Dy_{0.25})_2 Zr_2 O_7$; and mixtures thereof.

12. A coated component, comprising: a substrate having a surface; a thermal barrier coating on the surface, wherein the thermal barrier coating includes a layer comprising the composition of any preceding clause.

13. A coated component, comprising: a substrate having a surface; a thermal barrier coating on the surface, wherein the thermal barrier coating includes a layer comprising a rare earth-doped zirconium/hafnium oxide having a defect-fluorite structure or a pyrochlore structure, wherein the layer has a thermal conductivity of 0.5 W/m-K to 1.5 W/m-K at 1000° C. in a 95-100% dense puck, as measured via a laser flash method according to ASTM E1461-13.

14. The coated component of any preceding clause, wherein the layer has an indentation fracture toughness of 2 MPa-m$^{0.5}$ to 3 MPa-m$^{0.5}$ in a 95-100% dense puck.

15. The coated component of any preceding clause, wherein the rare earth-doped zirconium/hafnium oxide includes 4 or 5 different rare earth elements that are each present in a substantially equal atomic percentage.

16. The coated component of any preceding clause, wherein the layer includes a single phase of the rare earth-doped zirconium/hafnium oxide in a defect-fluorite structure.

17. The coated component of any preceding clause, wherein the layer includes a single phase of the rare earth-doped zirconium/hafnium oxide in a pyrochlore structure.

18. The coated component of any preceding clause, wherein the rare earth-doped zirconium/hafnium oxide having a defect-fluorite structure or a pyrochlore structure has a formula: $(Ln^1_a Ln^2_a Ln^3_a Ln^4_a Ln^5_b)_2 M_2 O_7$ where each of $Ln^1$, $Ln^2$, $Ln^3$, $Ln^4$, and $Ln^5$ is a different rare earth element such that $Ln^1$ and M have a first atomic radius ratio that is 1.35 to 1.45, $Ln^2$ and M have a second atomic radius ratio that is 1.35 to 1.45, $Ln^3$ and M have a third atomic radius ratio that is 1.46 to 1.78, and $Ln^4$ and M have a fourth radius ratio that is 1.46 to 1.78; a is 0.2 or 0.25; b is 0.2 when a is 0.2, and b is 0 when a is 0.25; M is Zr, Hf, or a mixture thereof.

19. The coated component of any preceding clause, where M is 95 atomic % to 100 atomic % of Zr.

20. A method of forming a rare earth-doped zirconium/hafnium oxide, the method comprising: combining 4 or 5 different rare earth zirconium/hafnium oxides to form a rare earth-doped zirconium/hafnium oxide having a defect-fluorite structure or a pyrochlore structure, wherein a first rare earth oxide includes a first rare earth element having a first atomic radius ratio to Zr that is 1.35 to 1.45, a second rare earth includes a second rare earth element having a second atomic radius ratio to Zr that is 1.35 to 1.45, a third rare earth oxide includes a third rare earth element having a first atomic radius ratio to Zr that is 1.46 to 1.78, and a fourth rare earth oxide includes a fourth rare earth element having a fourth atomic radius ratio to Zr that is 1.46 to 1.78, and wherein each of the different rare earth zirconium/hafnium oxides are present in substantially equal atomic amounts of their respective rare earth elements.

This written description uses exemplary embodiments to disclose the disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A composition comprising:
a rare earth-doped zirconium/hafnium oxide having a defect-fluorite structure or a pyrochlore structure, wherein the rare earth-doped zirconium/hafnium oxide has a formula:

$$(Ln^1_a Ln^2_a Ln^3_a Ln^4_a Ln^3_b)_2 M_2 O_7$$

where:
each of $Ln^1$, $Ln^2$, $Ln^3$, $Ln^4$, and $Ln^5$ is a different rare earth element such that $Ln^1$ and M have a first atomic radius ratio that is 1.35 to 1.45, $Ln^2$ and M have a second atomic radius ratio that is 1.35 to 1.45, $Ln^3$ and M have a third atomic radius ratio that is 1.46 to 1.78, and $Ln^4$ and M have a fourth radius ratio that is 1.46 to 1.78;
a is 0.2 or 0.25;
b is 0.2 when a is 0.2, and b is 0 when a is 0.25; and
M is Hf or a mixture of Zr and Hf.

2. The composition of claim 1, where a is 0.2 such that the rare earth-doped zirconium/hafnium oxide has a formula:

$$(Ln^1_{0.2} Ln^2_{0.2} Ln^3_{0.2} Ln^4_{0.2} Ln^5_{0.2})_2 M_2 O_7$$

where:
each of $Ln^1$, $Ln^2$, $Ln^3$, $Ln^4$, and $Ln^5$ is a different rare earth element such that $Ln^1$ and M have a first atomic radius ratio that is 1.35 to 1.45, $Ln^2$ and M have a second atomic radius ratio that is 1.35 to 1.45, $Ln^3$ and M have a third atomic radius ratio that is 1.46 to 1.78, and $Ln^4$ and M have a fourth radius ratio that is 1.46 to 1.78.

3. The composition of claim 2, wherein $Ln^5$ and M have a second atomic radius ratio that is either 1.35 to 1.45 or 1.46 to 1.78.

4. The composition of claim 1, where a is 0.25 and b is 0 such that the rare earth-doped zirconium/hafnium oxide has a formula:

$$(Ln^1_{0.25} Ln^2_{0.25} Ln^3_{0.25} Ln^4_{0.25})_2 M_2 O_7$$

where:
each of $Ln^1$, $Ln^2$, $Ln^3$, and $Ln^4$ is a different rare earth element such that $Ln^1$ and M have a first atomic radius ratio that is 1.35 to 1.45, $Ln^2$ and M have a second atomic radius ratio that is 1.35 to 1.45, $Ln^3$ and M have a third atomic radius ratio that is 1.46 to 1.78, and $Ln^4$ and M have a fourth radius ratio that is 1.46 to 1.78.

5. The composition of claim 1, wherein each of $Ln^1$ and $Ln^2$ is a different rare earth element selected from the group consisting of Tb, Dy, Y, Ho, Er, Tm, Yb, and Lu.

6. The composition of claim 1, wherein each of $Ln^3$ and $Ln^4$ is a different rare earth element selected from the group consisting of La, Ce, Pr, Nd, Pm, Sm, Eu, and Gd.

7. The composition of claim 1, wherein the composition has a thermal conductivity of 0.5 W/m-K to 1.5 W/m-K at 1000° C. in a 95-100% dense puck, as measured via a laser flash method according to ASTM E1461-13.

* * * * *